United States Patent [19]

Clagett et al.

[11] Patent Number: 5,340,885
[45] Date of Patent: Aug. 23, 1994

[54] AMIDE-ESTER COPOLYMERS AND PROCESS FOR THE PREPARATION THEREOF

[75] Inventors: Donald C. Clagett; Daniel W. Fox; Louis M. Maresca; Sheldon J. Shafer, all of Pittsfield, Mass.

[73] Assignee: General Electric Company, Pittsfield, Mass.

[21] Appl. No.: 8,272

[22] Filed: Jan. 25, 1993

Related U.S. Application Data

[63] Continuation of Ser. No. 506,915, Apr. 9, 1990, abandoned, which is a continuation of Ser. No. 117,245, Nov. 4, 1987, abandoned.

[51] Int. Cl.$^5$ ...................... C08L 77/12; C08G 69/44
[52] U.S. Cl. .................... 525/425; 525/434; 528/288
[58] Field of Search ................. 525/425, 434

[56] References Cited

U.S. PATENT DOCUMENTS

| | | | |
|---|---|---|---|
| 3,272,774 | 9/1966 | Moyer, Jr. ................... | 260/47 |
| 3,493,632 | 2/1970 | Okazaki et al. ............. | 525/425 |
| 3,660,356 | 5/1972 | Radlmann et al. ........... | 525/425 |
| 4,252,920 | 2/1981 | Deleens et al. .............. | 525/430 |
| 4,567,249 | 1/1986 | Fox et al. ..................... | 528/347 |
| 4,772,649 | 9/1988 | Andrews et al. ............. | 524/195 |

FOREIGN PATENT DOCUMENTS

| | | |
|---|---|---|
| 0235384 | 9/1987 | European Pat. Off. . |
| 0276874 | 3/1988 | European Pat. Off. . |
| 57-207643 | 6/1981 | Japan . |

*Primary Examiner*—Ana L. Carrillo

[57] ABSTRACT

Copolymers comprising amide units and ester units are prepared by melt phase interchange of diaryl esters of dicarboxylic acids and diamines with dihydric alcohols and diesters of aromatic dicarboxylic acids. The products are tough resins, useful per se as molding compounds, and to compatibilize and toughen other thermoplastic polymers.

9 Claims, No Drawings

AMIDE-ESTER COPOLYMERS AND PROCESS FOR THE PREPARATION THEREOF

CROSS REFERENCE TO RELATED APPLICATION

This is a continuation of Ser. No. 07/506,915 filed on Apr. 9, 1990, now abandoned, which is a continuation of Ser. No. 07/117,245 filed on Nov. 4, 19987 now abandoned.

This application is related to the following commonly assigned application

| SERIAL NO. (ATTY'S DOCKET) | FIL- ING DATE | APPLI- TITLE | STA- CANTS | TUS |
|---|---|---|---|---|
| (337,2064) U.S. Ser. No. 07/117,250 | now aband- oned, | COPOLYMERS AND PROCESS FOR FOR THE PREPARATION THEREOF | D. C. Clagett D. W. Fox L. M. Maresca S. J. Shafer | Pend- ing |

FIELD OF THE INVENTION

The present invention relates to copolymer resins, thermoplastic compositions comprising them, and processes useful in their preparation. More particularly, it is concerned with copolymers comprising amide units and ester units, molding compositions comprising such copolymers and a melt phase process for their production by interchange of diaryl esters with diamines and dihydric alcohols.

BACKGROUND OF THE INVENTION

Blends of polyamides with polycarbonates, poly(ester carbonates) and polyarylates are known to exhibit desirable properties including excellent solvent resistance, ductility, hydrolytic stability and resistance to brittle failure when molded into articles. See, for example, the copending, commonly assigned U.S. patent application of L. M. Maresca, D. C. Clagett and U. S. Wascher, Ser. No. 812,433 filed Dec. 23, 1985 now abandoned, and U.S. Pat. No. 4,798,874, which is a continuation-in-part of Ser. No. 07/812,433. Novel polyamide-polyarylate copolymers have been prepared which have excellent and improved physical and mechanical properties, and good chemical resistance and barrier properties, and these are the subject matter of commonly assigned copending application Ser. No. 07/117,250, now abandoned. Such copolymers are prepared in a melt polymerization process. The microstructure of the polymer can be controlled by running the process in one or two steps. A wide variety of diamines, diphenols and diacid esters can be used in the process in both steps. If, for example, a polyamide polyarylate block copolymer is desired, a two step process is used. In the first step, for example, diphenyl iso/terephthalate is reacted with a diamine in the melt at, for example, 120° C.–280° C., to produce amide units. If a diphenol such as bisphenol-A and diphenyl iso/terephthalate is added in a second step and the temperature of 230° C.–320° C. is used arlyate units will then be smoothly produced at reduced pressures as byproduct phenol is removed. Although Fox and Shafer, U.S. Pat. No. 4,567,249, disclose the melt preparation of polyamides by amine-ester interchange, there is no hint of suggestion in that patent to employ the process employing both an amine on the one hand, and a dihydric phenol on the other. It has now been found that amide-ester copolymers, including random copolymers, block copolymers and alternating copolymers, can be synthesized by a melt polymerization process. If carried out stepwise, in one step a polyamide block can be formed by the reaction of a diamine with a diaryl ester, e.g., diphenyl iso/terephthalate at temperatures ranging from about 120° C. to about 280° C. In a second step, a diol such as ethylene glycol, or 1,4-butanediol can be used in the reaction along with diacid ester to form the polyester at similar temperatures i.e., more moderate than required to make the polyarylate blocks. The new materials, which can be made from a wide variety of diamines, diols and diacid esters, have excellent mechanical and physical properties good chemical resistance and barrier properties.

SUMMARY OF THE INVENTION

According to the present invention, there are provided block copolymers of the general formula

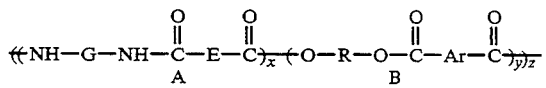

wherein units A comprise from about 1 to about 99 percent by weight of said copolymer and units B comprise from about 99 to about 1 percent by weight of said copolymer, where E is selected from divalent alkyl, aryl, cycloalkyl, arylalkyl and alkylaryl groups of from 1 to 30 carbon atoms or a mixture of any of the foregoing, optionally substituted with at least one chlorine, bromine, fluorine, nitro, nitrile, alkyl of from 1 to 6 carbon atoms, alkoxy of from 1 to 6 carbon atoms or aryl of from 6 to 20 carbon atoms; G is a divalent alkyl, aryl, cycloalkyl, arylalkyl or alkylaryl group of from about 2 to about 30 carbon atoms or a mixture of any of the foregoing, optionally interrupted with alkylene, arylene, carbonyl, ether, amino or sulfur-containing groups, optionally substituted with at least one of chlorine, bromine, fluorine, nitro, nitrile, alkyl of from 1 to 6 carbon atoms, alkoxy of from 1 to 6 carbon atoms or aryl of from 6 to 20 carbon atoms; R is a divalent alkyl, cycloalkyl, aliphatic ether group of from about 2 to about 20 carbon atoms or a mixture of any of such groups; and Ar is a divalent aromatic carbocyclic group, optionally substitued with at least one of chlorine, bromine, fluorine, nitro, nitrile, alkyl of from 1 to 6 carbon atoms, alkoxy of from 1 to 6 carbon atoms aryl of from 6 to 20 carbon atoms or a mixture of any of such groups, and x, y and z are each integers of from 1 to 100,000.

Preferred features of this aspect of the invention comprise a block copolymer as defined above wherein x and y are at least about 20. Preferred are copolymers wherein units of A comprise from about 20 to about 80 percent by weight and units of B comprise from about 80 to about 20 percent by weight of A and B combined, and especially preferred are copolymers wherein units of A comprise from about 40 to about 60 percent by weight and units of B comprise from about 60 to about 40 percent by weight of A and B combined.

Special mention is made of block copolymers as above defined wherein E and Ar are

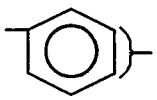

G is divalent alkyl cycloalkyl, aryl or alkylaryl of from about 2 to about 20 carbon atoms and R is

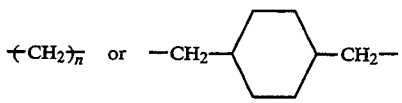

wherein n is an integer of from 2 to 6. Especially preferred are block copolymers wherein G is the residuum of ethylenediamine, trimethylenediamine, tetramethylenediamine, pentamethylenediamine, 2-methylpentamethylenediamine, hexamethylenediamine, isomeric trimethylhexamethylenediamine, meta-xylylenediamine, para-xylylenediamine, 1,3-bis(aminomethyl)cyclohexane, 1,4-bis(aminomethyl)cyclohexane, 1,3-diaminocyclohexane, 1,4-diaminocyclohexane, bis(4-aminocyclohexyl)methane, 2,2-bis(4-aminocyclohexyl)propane, 1,4-piperazine, meta-phenylenediamine, para-phenylenediamine, bis(4-aminophenyl)methane and the like or mixtures thereof.

Also provided by the present invention is a process to make the copolymers above defined, said process comprising heating a mixture of at least one diaryl ester of a dicarboxylic acid of the formula

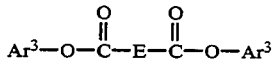

wherein the groups Ar³ represent the same or different aryl groups, optionally substituted with at least one of chlorine, bromine, fluorine or alkyl of from 1 to 6 carbon atoms and E is as above defined an amine of the formula

wherein G is as above defined and R² is hydrogen or alkyl of from 1 to 10 carbon atoms, a dihydric alcohol of the formula

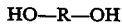

wherein R is as above defined and at least one diester of a dicarboxylic acid of the formula

wherein R³ is alkyl of from 1 to 12 carbon atoms or a group as defined for Ar³ above and Ar is as above defined optionally in the presence of an effective amount of a transesterification catalyst and removing byproduct phenol, alcohol and/or water until formation of said copolymer is substantially complete.

This process can be carried out in one or two stages depending on the structure of the final copolymer desired. For example carrying out the process in one stage with all components mixed produces a random copolymer in which x, y and z have no consistently recurring values. If, however, essentially stoicimetric amounts of the diaryl ester of a dicarboxylic acid and a diamine are reacted in the first stage followed by further polymerization in a second stage with essentially stoichiometric amounts of a diol and a diaryl or dialkyl ester of an aromatic dicarboxylic acid then a block copolymer is formed where in x and y are constantly greater than 15. In a third variation, if 2 equivalents of a diaryl ester of a dicarboxylic acid is reacted with a diamine in step one then very small nylon oligomers are formed; addition of a diol in a second step results in the formation of an essentially alternating amide-ester copolymer. Values of x and y are essentially less then about 5. In all cases the combined concentrations of diamines and diol must be essentially equal to the combined concentrations of the diaryl and/or dialky esters.

Preferably, the diaryl ester comprises a diaryl terephthalate, a diaryl isophthalate, a diaryl adipate or a mixture thereof. Especially preferably, the diaryl ester will comprise diphenyl isophthalate, diphenyl terephthalate or diphenyl adipate. Preferably also, the diamine comprises ethylenediamine, trimethylenediamine, tetramethylenediamine, pentamethylenediamine, 2-methylpentamethylenediamine, hexamethylenediamine, isomeric trimethylhexamethylenediamine, meta-xylylenediamine, para-xylylenediamine, 1,3-bis-(aminomethyl) cyclohexane, 1,4-bis (aminomethyl)cyclohexane, 1,3 diaminocyclohexane, 1,4-diaminocyclohexane, bis(4-aminocyclohexyl)methane, 2,2-bis(4-aminocyclohexyl)propane, 1,4-piperazine, meta-phenylenediamine, para-phenylenediamine, bis(4-aminophenyl)methane and the like or mixtures thereof. Preferably the diester of the aromatic dicarboxylic acid will comprise a dialkyl or diaryl terephthalate, a dialkyl or diaryl isophthalate or a mixture thereof. Special mention is made of a process wherein the dihydric alcohol comprises ethylene glycol, 1,4-butanediol, polybutylene glycol, 1,4-cyclohexanedimethanol, or a mixture of any of the foregoing.

Also among the preferred features of the invention are copolymers prepared in a melt phase process by the interchange of an excess of a diamine or diaryl ester to produce a polyamide having amine or ester terminal groups and further reacting the the polyamide with a dihydric alcohol and a diester of a dicarboxylic acid to form a polyamide-polyester block copolymer containing from about 1 to about 99 percent by weight of polyamide segments and from about 99 to about 1 percent by weight of polyester segments. In these, preferably, the diamine comprises a diprimary or disecondary amine.

The copolymers are thermoformable into shaped articles which are tough, thermally stable and resistant to chemicals and hydrolysis. They are also useful as blending resins.

DETAILED DESCRIPTION OF THE INVENTION

As examples of diamines particularly suitable for use in preparing the A units can be mentioned diprimary and disecondary as well as mixed primary and secondary diamines of the general formula above. Illustrative examples are ethylenediamine, trimethylenediamine, tetramethylenediamine, pentamethylenediamine, 2-methylpentamethylene diamine, hexamethylenediamine, isomeric trimethylhexamethylenediamine, meta-xylylenediamine, para-xylylene diamine, 1,3-bis-(aminomethyl) cyclohexane, 1,4-bis (aminomethyl)cyclohexane, 1,3-diaminocyclohexane, 1,4-diaminocyclohexane, bis(4-aminocyclohexyl)methane, 2,2-bis(4-aminocyclohexyl)propane, 1,4-piperazine, meta-phenylenediamine, para-phenylenediamine, bis(4-aminophenyl)methane and the like or mixtures thereof.

Illustratively useful diesters suitable as sources for structural units E are esters of dicarboxylic acids such as diphenylic esters derived from phenolic compounds, e.g., a monohydric phenol, including phenol itself, and alkyl- or halo-substituted phenols, such as o-, m- and p-cresols, and o- and p-chlorophenol and the like, and a dicarboxylic acid, such as adipic, sebacic, glutaric, phthalic, terephthalic, isophthalic, naphthalene dicarboxylic, biphenyl dicarboxylic acid, and the like. A preferred family of diesters comprises the diphenyl esters of terephthalic acid, isophthalic acid, and mixtures thereof.

With respect to the ester unit B, these are derived from an aliphatic, aliphatic ether or cycloaliphatic diols, or mixtures thereof, containing from 2 to about 10 carbon atoms and at least one aromatic dicarboxylic acid. Preferred polyester blocks are derived from an aliphatic diol and an aromatic dicarboxylic acid and have repeating units of the following general formula:

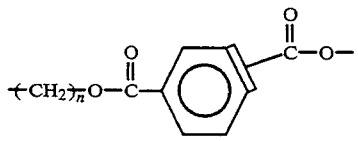

wherein n is an integer of from 2 to 6. The most preferred polyester blocks comprise poly(ethylene terephthalate) or poly(1,4-butylene terephthalate).

Also contemplated herein are units of the above esters with minor amounts, e.g., from 0.5 to about 2 percent by weight, of units derived from aliphatic acids and/or aliphatic polyols, to form copolyesters. The aliphatic polyols include glycols, such as poly (ethylene glycol). All such polyesters can be made following the teachings of, for example, U.S. Pat. Nos. 2,465,319 and 3,047,539.

The ester units that are derived from a cycloaliphatic diol and an aromatic and/or cycloaliphatic dicarboxylic acid are prepared, for example, from reaction of either the cis-or trans-isomer (or mixtures thereof), of 1,4-cyclohexanedimethanol, with an aromatic dicarboxylic acid so as to produce an ester having units of the following formula:

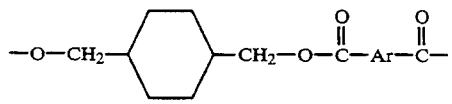

wherein the cyclohexane ring is selected from the cis- and trans-isomers thereof and Ar represents an aryl or substituted aryl radical containing 6 to 20 carbon atoms and which is the decarboxylated residue derived from an aromatic dicarboxylic acid.

Examples of aromatic dicarboxylic acids represented by the decarboxylated residue Ar are isophthalic or terephthalic acid, 1,2-di(p-carboxyphenyl) ethane, 4,4'-dicarboxydiphenyl ether, etc., and mixtures of these. All of these acids contain at least one aromatic nucleus. Acids containing fused rings can also be present, such as in 1,4- or 1,5-naphthalenedicarboxylic acids. The preferred dicarboxylic acids are terehthalic acid or a mixture of terephthalic and isophthalic acids.

Another preferred ester unit may be derived from the reaction of either the cis- or trans-isomer (or a mixture thereof) of 1,4-cyclohexanedimethanol with a mixture of isophthalic and terephthalic acids. Such an ester would have units of the formula:

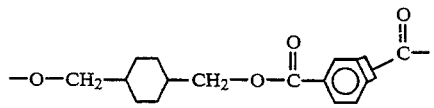

Also included within this invention are polyesters derived from aliphatic ether diols, for example, tetraethyleneoxy diol, and the same diesters of diacids.

In general, any diester of an aromatic dicarboxylic acid conventionally used in the preparation of polyesters, may be used for the preparation of the polyester blocks described above. The esters of aromatic dicarboxylic acids which may be used include those of aliphatic-aromatic dicarboxylic acids, in addition to those of wholly aromatic dicarboxylic acids.

The diesters of dicarboxylic acids are represented by the general formula:

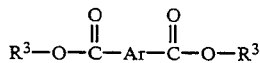

wherein $R^3$ and Ar are as defined above, Ar being, for example, phenylene, naphthylene, biphenylene, substituted phenylene, etc.; two or more aromatic groups connected through non-aromatic linkages or a divalent aliphatic-aromatic hydrocarbon radical such as an arylalkyl or alkylaryl radical. For purposes of the present invention, $R^3$ is an aliphatic or cycloaliphatic radical, such as methyl, ethyl, n-propyl, dodecyl, octadecyl or an aromatic radical such as phenylene, biphenylene, naphthylene, substituted phenylene, etc. Some nonlimiting examples of suitable diesters of aromatic dicarboxylic acids which may be used in preparing the ester units of the instant invention include dialkyl and diaryl esters of phthalic acid, isophthalic acid, terephthalic acid, homophthalic acid, o-, m-, and p-phenylenediacetic acid, and the polynuclear aromatic acids such as diphenyl dicarboxylic acid, and isomeric naphthalene dicarboxylic acids. The aromatics may be substituted with inert groups such as bromine, chlorine, fluorine alkyl of from 1 to 6 carbon atoms, alkoxy of from 1 to 6 carbon atoms, aryl of from 6 to 20 carbon atoms, and the like. Of course, these esters may be used individually or as mixtures of two or more different acids.

If desired, a conventional esterification catalyst can be used. Preferred as catalysts suitable for this purpose are, for example, acetates, carboxylates, hydroxides, oxides, alcoholates or organic complex compounds of zinc, manganese, antimony, cobalt, lead, calcium and the alkali metals. Preferably, inorganic or organic titanium-containing catalysts will be used such as tetrabutyl titanate or tetraoctyl titanate. In general, from about 0.005 to about 2.0 percent by weight of catalyst will be used, based on ester forming reactants. The alcoholic or phenolic byproducts can be removed, e.g., by vacuum devolatilization in the reactor or an extruder or a combination of the two. Alternatively, the byproduct can be solvent-extracted, e.g., with toluene. The resulting copolymer can be recovered in any convenient manner, remaining, for example, as a residue after vacuum devolatilization, or by precipitation from a solvent by means of an antisolvent, such as methanol.

The products of the process may be molded in any desired shape and are useful as structural and engineering materials to replace metal parts, in automotive applications, electrical appliances, and in food wrappings, as stand alone resins, in blends with other resins such as polyesters, polyarylates and nylons and as tie resins to bond two different resin layers.

DESCRIPTION OF THE PREFERRED EMBODIMENTS

The following examples illustrate the invention. They are not to be construed to limit the claims in any manner whatsoever.

EXAMPLE 1

A 4CV Helicone mixer was charge with 487.1 g (1.53 moles) of diphenyl isophthalate and 174.3 g (1.50 moles) of hexamethylenediamine and blanketed with nitrogen. Agitation was started and the temperature was raised to 180° C.-185° C. After 45 minutes at 180° C. to 185° C. the temperature was lowered to 165° C. and 324.0 g (1.67 moles) of dimethyl terephthalate, 251.0 g (2.79 moles) of 1,4-butanediol and 1.0 ml of tetraoctyl titanate were added. After 15 minutes methanol began to distill. The reaction temperature was increased to 200° C.-205° C. after 75% of the theoretical amount of methanol distilled and 235° C. at 95% theoretical. A partial vacuum of 125 mm of Hg was applied to the system and slowly decreased to full vacuum, less than 2 mm of Hg, over 1 hour. At full vacuum, the temperature was increased to 250° C.-255° C. and held there for 2 to 2.5 hours. After breaking vacuum the block copolymer was discharged from the reactor and allowed to cool to room temperature. The polymer extrudate was tough and opaque. Its instrinsic viscosity (IV), glass transition temperature (Tg) and melting point (Tm) are shown in Table 1.

EXAMPLES 2 AND 3

Example 1 was repeated and the resulting block copolymers were tough and had the IVs, Tgs and Tms shown in Table 1.

TABLE 1

| Example | IV[1] | Tg(°C.)[2] | Tm(°C.)[2] |
|---|---|---|---|
| 1 | 0.77 | 118 | 219 |
| 2 | 0.76 | 115 | 218 |
| 3 | 0.69 | 115 | 218 |

[1]Intrinsic Viscosity, measured in phenol/tetrachloroethane (60/40) at 23° C.
[2]Glass transition and melting temperatures, measured by differential scanning calorimetry.

EXAMPLE 4 AND 7

If the procedure of Example 1 is repeated, substituting for the hexamethylenediamine, 1,3-bis(aminomethyl)cyclohexane, 1,4-bis(aminomethyl)cyclohexane, meta-xylylenediamine or para-xylylene diamine, block copolymers according to this invention will be obtained.

EXAMPLE 8

If the procedure of Example 1 is repeated, substituting piperazine for hexamethylenediamine, a block copolymer product according to this invention will be obtained.

EXAMPLE 9

If the procedure of Example 1 is repeated, substituting diphenyl adipate for diphenyl isophthalate in the first stage, a block copolymer according to the invention will be obtained.

EXAMPLE 10

If the procedure of Example 1 is repeated, substituting for the diphenyl isophthalate in the first stage a 50—50 weight/weight mixture of diphenyl isophthalate and diphenyl terephthalate and dimethyl isophthalate in the second stage, a block copolymer according to this invention will be obtained.

EXAMPLES 11-12

If the procedure of Example 1 is repeated, substituting, respectively, ethylene glycol or 1,4-cyclohexanedimethanol for the 1,4-butanediol employed in the second stage, block copolymers in accordance with this invention will be obtained.

EXAMPLE 13

If the procedure of Example 1 is carried out in one stage, by adding all of the ingredients, including the catalyst, at once to the reactor, a random amide-ester copolymer in accordance with this invention will be obtained.

EXAMPLE 14

The procedure of Example 1 is repeated except that 2 equivalents of diphenyl isophthalate is reacted with hexamethylenediamine in step 1. One equivalent of 1,4-butanediol is added in step 2. An essentially alternating amide ester copolymer in accordance with this invention is produced.

The above-mentioned patents, patent applications and publications are incorporated herein by reference.

Many variations of this invention will suggest themselves to those skilled in this art in light of the above, detailed description. For example, instead of diphenyl isophthalate and diphenyl terephthalate, the following diaryl esters can be used, diphenyl adipate, diphenyl sebacate, diphenyl glutarate, diphenyl naphthalene dicarboxylate, diphenyl biphenyl dicarboxylate, mixtures of any of the foregoing, and the like. Instead of hexamethylenediamine and the other diamines used, the following may be substituted: ethylenediamine, trimethylenediamine, tetramethylenediamine, pentamethylenediamine, 2-methylpentamethylenediamine, hexamethylenediamine, isomeric trimethylhexamethylenediamine, meta-xylylenediamine, para-xylylenediamine, 1,3-bis(aminomethyl) cyclohexane, 1,4-bis(aminomethyl)cyclohexane, 1,3-bis(aminomethyl)cyclohexane, 1,4-bis(aminomethyl) cyclohexane, 1,3-diaminocyclohexane, 1,4-diaminocylohexane, bis(4-aminocyclohexyl)methane, 2,2-bis(4-aminocyclohexyl)propane, 1,4-piperazine, meta-phenylenediamine, para-phenylenediamine, bis(4-aminophenyl) methane and the like or mixtures thereof. Instead of 1,4-butanediol, there can be substituted ethylene glycol, 1,3-propanediol, 1,4-cyclohexanedimethanol, polytetramethylene ether diol, mixtures of any of the foregoing and the like. All such obvious variations are within the full intended scope of the appended claims.

We claim:

1. An alternating copolymer of the formula:

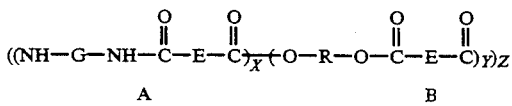

prepared by (a) reacting two equivalents of a diaryl ester of a dicarboxylic acid having the formula:

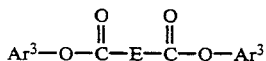

with a diamine of the formula:

and then (b) reacting the product formed in (a) with a diol of the formula:

to form the alternating amide-ester-ether copolymer, wherein units A comprise from about 1 to about 99 percent by weight of said copolymer and units B comprise from about 99 to about 1 percent by weight of said copolymer, where E is a divalent aryl group unsubstituted or substituted with at least one chlorine, bromine, fluorine, nitro, nitrile, alkyl of from 1 to 6 carbon atoms, alkoxy of from 1 to 6 carbon atoms or aryl of from 6 to 20 carbon atoms, or a mixture of any of the foregoing; G is a divalent, aryl, or cycloalkyl group of from about 2 to about 30 carbon atoms or a mixture of any of the foregoing, or G is as defined and is interrupted with alkylene, arylene, carbonyl, ether, amino or sulfur containing groups, unsubstituted or substituted with at least one of chlorine, bromine, fluorine, nitro, nitrile, alkyl of from 1 to 6 carbon atoms, alkoxy of from 1 to 6 carbon atoms, or aryl of from 6 to 20 carbon atoms, or a mixture of any of the foregoing; R is a divalent alkyl, cycloalkyl, or aliphatic ether group of from about 2 to about 20 carbon atoms or a mixture of such groups; $Ar^3$ is the same or different aryl group or aryl group substituted with at least one of chlorine, bromine, fluorine, or alkyl of from 1 to 6 carbon atoms, and $R^2$ is hydrogen or an alkyl radical having from 1 to 10 carbon atoms; and x, y and z are integers of from 1 to 100,000.

2. A copolymer as defined in claim 1 wherein units of A comprise from about 20 to about 80 percent by weight and units of B comprise from about 80 to about 20 percent by weight of A and B combined.

3. A copolymer as defined in claim 2 wherein units of A comprise from about 40 to about 60 percent by weight and units of B comprise from about 60 to about 40 percent by weight of A and B combined.

4. A copolymer as defined in claim 1 wherein E is the residue of a diacid selected from phthalic, terephthalic, isophthalic, naphthalene, biphenyl dicarboxylic acids or a mixture of any of the foregoing.

5. A copolymer as defined in claim 1 wherein E is the residue of a diacid selected from phthalic, terephthalic, isophthalic, naphthalene, biphenyl dicarboxylic acids or other aromatic dicarboxylic acids.

6. A copolymer as defined in claim 5 wherein E is

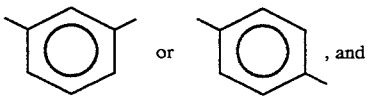

R is

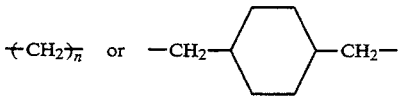

n is an integer of from 2 to 6.

7. A copolymer as defined in claim 1 wherein G is selected from meta-xylylenediamine, paraxylylenediamine, 1,3-bis(aminomethyl)cyclohexane, 1,4-bis-(aminomethyl)cyclohexane, 1,3-diaminocyclohexane, 1,4-diaminocyclohexane, bis(4-aminocyclohexyl)methane, 2,2-bis(4-aminocyclohexyl)propane, 1,4-piperazine, meta-phenylenediamine, para-phenylenediamine, bis(4-aminophenyl)methane, or mixtures thereof.

8. A copolymer as defined in claim 1 wherein R is a residuum of a diol selected from ethylene glycol, propanediol, 1,4-butanediol, polytetramethylene ether diol, 1,4-cyclohexanedimethanol or a mixture of any of the foregoing.

9. A copolymer as defined in claim 8 wherein R is a residuum of 1,4-butanediol.

* * * * *